United States Patent Office 3,509,115
Patented Apr. 28, 1970

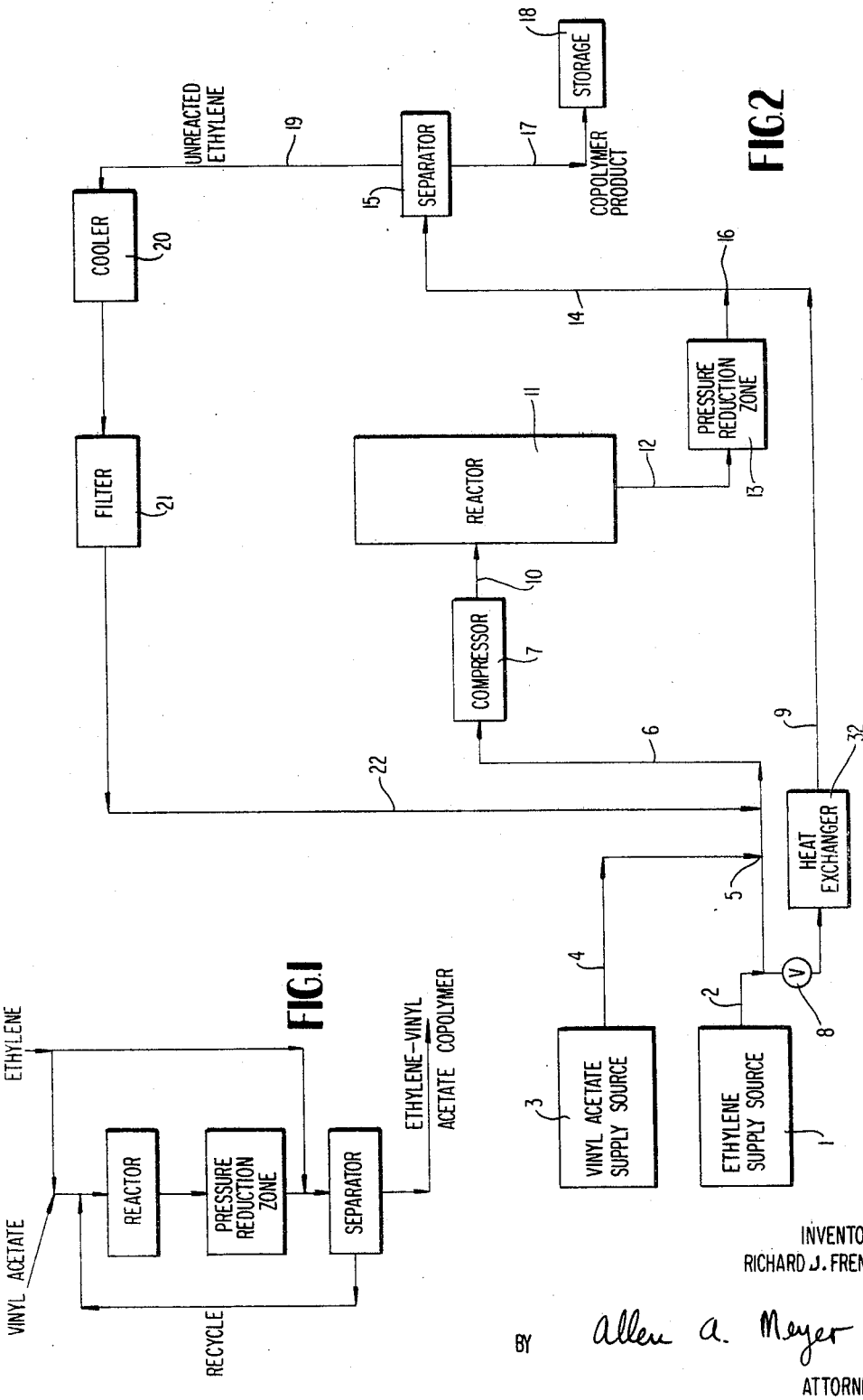

3,509,115
PROCESS OF PREPARING ETHYLENE-VINYL
ACETATE COPOLYMERS
Richard J. French, Tuscola, Ill., assignor to National
Distillers and Chemical Corporation, New York, N.Y.,
a corporation of Virginia
Filed Dec. 11, 1968, Ser. No. 783,106
Int. Cl. C08f 1/06
U.S. Cl. 260—87.3          9 Claims

ABSTRACT OF THE DISCLOSURE

In a process for the production of ethylene-vinyl acetate copolymers at elevated temperatures and pressures wherein the product is subjected to a high pressure recovery step to remove unreacted ethylene, the improvement of reducing the temperatures during said recovery step by adding ethylene feed material to the product prior to the recovery step results in reducing the acetic acid odor in the copolymer without deleteriously affecting its properties.

BACKGROUND OF THE INVENTION

Processes for the production of ethylene-vinyl acetate copolymers are well known in the art. Generally, these processes comprise copolymerizing ethylene and vinyl acetate in the presence of conventional polymerization catalysts. Recently, it has been found economical and efficient to carry out the copolymerization processes at elevated temperatures and pressures. Following the copolymerization reaction, the reaction mixture is reduced in pressure by passage through pressure letdown valves and introduced into a separator wherein unreacted ethylene is separated from the product copolymer at reduced pressures. The unreacted ethylene is recycled to the reactor.

It has been found, however, that the elevated temperatures and lowered pressures in the separation zone combine to effect a partial decomposition of the copolymer, and/or the unreacted vinyl acetate resulting in the production of small quantities of acetic acid, ketene and carbon dioxide. The acetic acid impurity in the product copolymer is particularly objectionable for various reasons. Firstly, its objectionable vinegar odor renders the copolymer unsatisfactory for forming films contemplated for use in the food packaging, etc. industry. Secondly, the acetic acid content in the copolymer renders it unfit for any applications requiring a pure product.

Various techniques have been suggested to eliminate the objectionable odor of the vinyl acetate copolymer. Some of these methods were designed to remove the odor such as by contacting the copolymer with odor removing scavengers, aerating the copolymer or by washing the odor with deodorants. Other methods were designed to prevent the odor by preventing the decomposition of the vinyl acetate component to the objectionable acetic acid.

The odor removing techniques have all proved to be generally inadequate. The use of chemical scavengers or deodorants have caused some undesirable alterations in the properties of the resin, whereas aeration has only been successful in reducing the odor to an almost negligible extent.

On the other hand, odor preventing techniques have heretofore proved to be equally as unsatisfactory. Since the most likely source of the acetic acid is from the thermal degradation of the ethylene or of the vinyl acetate itself, it was thought that by reducing the temperature of the high pressure separator the problem could be avoided. The most obvious way of cooling the separator, i.e. by reducing the reactor exit temperature, proved to have detrimental effects on impact strength of the film and on the optical properties of the film.

Other techniques proposed included reducing the residence time of the product in the separator or admixing a small quantity of an alcohol with the polymer in an attempt to esterify the odor producing agent.

A need therefore existed for a method for reducing the acetic acid odor in vinyl acetate copolymers which would not deleteriously affect its properties.

And accordingly, it is an object of the present invention to provide a process whereby acetic acid odor can be substantially reduced or inhibited.

SUMMARY OF THE INVENTION

It has now been found that by introducing at least a portion of the ethylene feed into the reaction mixture after it has been reduced in pressure and prior to its introduction into the separator, the temperature therein can be substantially reduced and the decomposition of the product copolymer or the unreacted vinyl acetate can be substantially reduced, thereby inhibiting the amount of acetic acid impurity contained in the final product.

Briefly, the invention comprises a process for the preparation of copolymers of ethylene and vinyl acetate comprising the steps of (a) feeding ethylene and vinyl acetate into a reaction zone, (b) reacting said ethylene and vinyl acetate in said reaction zone at elevated temperatures and pressures, (c) passing the reaction mixture from (b) through a pressure reduction zone to reduce the pressure of said reaction mixture wherein the temperature of said reaction mixture is concomitantly raised due to reverse Joule-Thomson effects, (d) introducing said reaction mixture into a separation zone wherein said reaction mixture is separated into gaseous, unreacted ethylene and said copolymers and (e) recycling said unreacted ethylene to said reaction zone, the improvement comprising reducing the elevated temperature reached in said pressure reduction zone by introducing at least a portion of said ethylene feed into said reaction mixture after the said reduction in pressure thereof and prior to the introduction thereof into said separation zone whereby the temperature in said separation zone is substantially reduced and the decomposition of said copolymer to acetic acid in said separation zone due to elevated temperature is substantially inhibited.

DETAILED DESCRIPTION OF THE INVENTION

Generally, ethylene and vinyl acetate are copolymerized at temperatures in the range of from about 120 to about 330° C. and at pressures in the range of from about 20,-000 to about 50,000 p.s.i. It is especially preferred to carry out the copolymerization process at a temperature in the range of about 240 to about 260° C. and at a pressure of from about 30,000 to about 32,000 p.s.i.

The ratio of ethylene to vinyl acetate in the reaction zone may vary from about 0.5 by weight to about 50% by weight, and preferably from about 2% by weight to about 6% by weight.

It is preferable, although not mandatory, to carry out the copolymerization reaction in the presence of a catalyst. Generally, any of the conventional polymerization catalysts may be employed in the process of the present invention. Particularly suitable are the free radical catalysts, particularly the per compounds such as t-butyl peroxide, t-butyl perbenzoate, t-butyl perisobutyrate. The amount of catalyst is not critical and may vary from about 100 to about 1000 parts per million based on the copolymer product.

Generally, the ethylene is admixed with the vinyl acetate comonomer and the resulting mixture compressed up to the pressure necessary to effect copolymerization. The catalyst may be added either to the ethylene or vinyl acetate streams or to the mixture thereof.

Any of the conventially employed modifiers, additives, fillers, etc., may be added to the reactant streams or to the mixture. For example chain transfer agents such as: propylene, isobutylene, cyclohexane, butene-1, n-butene, may be added to control melt flow or antioxidants such as dialkyl phenol sulfide butylated hydroxy toluene or butylated hydroxy anisol may be added for stabilization.

Following the reaction, the reaction mixture is reduced in pressure by passage from the reactor through a pressure let-down valve or other pressure reducing means and transported to a separation zone wherein the pressure is further reduced and unreacted ethylene gas separated therefrom at still elevated temperatures. Generally, the pressure of the reaction mixture is reduced in value in the pressure reduction zone by an amount in the range of from about 16% to about 1.0% of the pressure in the reactor. Preferably, the pressure is reduced in value by an amount in the range of from about 10% to about 12%.

It is well known that the temperature of ethylene, and consequently the temperature of the reaction mixture, increases upon being reduced in pressure because of a reverse Joule-Thomson effect.

Due to this increase in temperature, the copolymer product is partially decomposed to produce acetic acid which has the disadvantageous results discussed above. It has been found that by introducing at least a portion of the ethylene feed into the reaction mixture prior to separation of the ethylene component, the temperature in the separator can be substantially reduced to a value below that at which substantial decomposition of the copolymer takes place.

It is necessary to the practice of the invention that the ethylene be introduced into the reaction mixture after the pressure has been partially reduced in the pressure reduction zone and prior to its entry into the separation zone. The amount of ethylene to be added in any particular operation is, of course, dependent upon the pressures and temperatures employed in the reactor, the degree of pressure reduction in the pressure reduction zone, the temperature of the ethylene, etc. Generally, sufficient ethylene is introduced into the reaction mixture to reduce the temperature in the separation zone to a value in the range of from about 190° C. to about 260° C.

The temperature of the ethylene feed stream may vary considerably over a relatively wide range from −30° C. to 75° C. The pressure of the ethylene feed is slightly greater than the pressure of the reaction mixture stream it is injected into.

In a typical operation, wherein the temperature in the reactor is in the range of from about 240 to about 260° C. and the pressure is in the range of from about 30,000 to about 32,000 p.s.i. and wherein the pressure of the reaction mixture is reduced in value in the pressure reduction zone by an amount of from about 10 to about 12% and wherein the temperatures and pressures in the pressure reduction zone would be from about 300° C. to about 320° C. and from about 3600 to about 3000 p.s.i. an amount of ethylene in the range of from about 10 to about 20% of the total ethylene feed should be introduced into the reaction mixture to reduce the temperature in the separation zone from 220° to about 260° C.

It will be obvious to those skilled in the art, however, that the introduction of any quantity of lower temperature ethylene into the reaction mixture at a pressure only slightly above that of the reaction mixture will have the effect of reducing the temperature in the separation zone. A heat exchange device in the feed stream could be used to obtain the desired ethylene temperature.

Following the separation step, the ethylene-vinyl acetate copolymer product is removed from the system for further processing or use. The unreacted ethylene is cooled and purified if desired, and recycled to the reactor.

DETAILED DESCRIPTION OF THE DRAWING

The process of the invention will be further described with reference to the accompanying drawing wherein FIG. 1 represents a flow diagram of the process and FIG. 2 represents a schematic diagram of an apparatus system suitable for carrying out the process of the invention.

Referring to FIG. 2, ethylene from an ethylene supply source 1 is conveyed through line 2 and mixed with vinyl acetate from vinyl acetate supply source 3 which is conveyed in line 4. The respective streams merge at 5 and are conveyed through line 6 to compressor 7. A cutoff valve or similar means 8 is provided in line 2 for diverting at least a portion of the ethylene feed in line 2 into line 9.

The ethylene-vinyl acetate mixture is compressed in compressor 7 to the pressure necessary to effect the copolymerization reaction. The mixture is conveyed through line 10 into reactor 11 and copolymerized therein to produce the ethylene-vinyl acetate copolymer.

Following the reaction, the reaction mixture is conveyed from reactor 11 through line 12 through a pressure reduction zone which may be a letdown valve or similar means 13. The pressure of the reduction mixture is decreased therein and conveyed through line 14 to separator 15.

After leaving the pressure reduction zone, the ethylene-vinyl acetate mixture is admixed with at least a portion of the ethylene feed conveyed through heat exchanger 32 and line 9. Admixing the ethylene feed with the reaction mixture at juncture 19, reduces the temperature of the reaction mixture to a value which will enable the separation of ethylene from the product in separator 15 without the concomitant production of acetic acid.

The ethylene-vinyl actate copolymer product is withdrawn from separator 15 through line 17 and conveyed to storage 18. The unreacted ethylene separated from the reaction mixture in separator 15 is conveyed through line 19 to cooler 20 wherein it is reduced in temperature and through filter 21 wherein it is purified and recycled via line 22 to line 6 wherein it is mixed with the incoming ethylene-vinyl acetate feed mixture.

To further illustrate the present invention, the following examples are presented. It should be clearly understood, however, that the invention is not intended to be limited in any manner except by the appended claims.

EXAMPLE 98 parts ethylene and 2 parts vinyl acetate were fed into a reaction zone which had a temperature profile of from 301° F. at the entrance to 488° F. at the exit. The reaction zone was maintained at a pressure of 30,000 p.s.i.g. Residence time within the reactor was 29 seconds. The reaction mixture was then passed from the reaction zone into a high pressure separator which was operated at pressures of about 3630 p.s.i.g. The inlet temperature was 535° F. An ethylene quench gas stream at a temperature of 200° F. was fed into a high pressure separator, near the product stream entrance at a flow rate of approximately 6000 p.p.h. The contents of the separator were thereby cooled to 460° F. The amount of product recovered was 3250 p.p.h. The amount of acetic acid detected in the product averaged 95±26 p.p.m. (10 analyses).

In a second part of the same test the separator temperature was further reduced to 430° F. by introducing 12,000 p.p.h. of 226° F. ethylene into the separator and the acetic acid content averaged 49±12 p.p.m. (6 analyses) on the product.

In comparison, the same product produced without introducing the ethylene quench stream into the separator contained an average of 747±138 p.p.m. (7 analyses).

It is to be understood that the accompanying drawing and the above description represent only a preferred system for carrying out the process of the invention. It will be apparent to those skilled in the art that many modifications of the apparatus and system depicted may be made without departing from the true spirit and scope of the invention.

I claim:
1. In a process for the preparation of copolymers of ethylene and vinyl acetate comprising the steps of: (a) feeding ethylene and vinyl acetate into a reaction zone, (b) reacting said ethylene and vinyl acetate in said reaction zone at elevated temperatures and pressures, (c) passing the reaction mixture from (b) through a pressure reduction zone to reduce the pressure of said reaction mixture wherein the temperature of said reaction mixture is concomitantly raised, (d) introducing said reaction mixture into a separation zone wherein said reaction mixture is separated into gaseous, unreacted ethylene and said copolymer at an elevated temperature and pressure, and (e) recycling said unreacted ethylene to said reaction zone, the improvement comprising reducing the elevated temperature reached in said pressure reduction zone by introducing at least a portion of said ethylene feed into said reaction mixture after the said reduction in pressure thereof and prior to the introduction thereof into said separation zone whereby the temperature in said separation zone is substantially reduced and the decomposition of said copolymer to acetic acid in said separation zone due to elevated temperature is substantially inhibited.

2. The process of claim 1 wherein in step (b) said elevated temperatures are in the range of from about 120° C. to about 330° C. and said elevated pressures are in the range of from about 20,000 p.s.i. to about 50,000 p.s.i.

3. The process of claim 1 wherein the ratio of ethylene to vinyl acetate in said reaction zone is in the range of from about 0.5% to about 50% by weight.

4. The process of claim 1 wherein said step (b) is conducted in the presence of a polymerization catalyst.

5. The process of claim 4 wherein said polymerization catalyst is a free-radical catalyst.

6. The process of claim 5 wherein said free-radical catalyst is a per- compound.

7. The process claim 1 wherein the pressure of said reaction mixture is reduced in value in step (c) by an amount in the range of from about 16% to about 1.0%.

8. The process of claim 1 wherein an amount of ethylene in the range of from about 10% to about 20% of the total ethylene feed is introduced into the reaction mixture.

9. The process of claim 1 wherein the temperature in said separation zone is reduced to a value in the range of from 190° C. to about 260° C.

References Cited
UNITED STATES PATENTS

| 2,386,347 | 10/1945 | Roland | 260—87.3 |
| 2,703,794 | 3/1955 | Roedel | 260—87.3 |

JOSEPH L. SCHOFER, Primary Examiner

J. C. HAIGHT, Assistant Examiner

U.S. Cl. X.R.
260—80.81